United States Patent [19]

Hijazi

[11] Patent Number: 4,964,597
[45] Date of Patent: Oct. 23, 1990

[54] SPACE VEHICLE WITH COLLAPSIBLE LIVING QUARTERS

[76] Inventor: Yousef Hijazi, P.O. Box 2, Makkah, Saudi Arabia

[21] Appl. No.: 323,751

[22] Filed: Mar. 15, 1989

[51] Int. Cl.$^5$ ............................................. B64G 1/10
[52] U.S. Cl. .................................. 244/159; 52/79.4; 52/79.5
[58] Field of Search ................. 244/159; 52/79.5, 79.4

[56] References Cited

U.S. PATENT DOCUMENTS

| | | | |
|---|---|---|---|
| 3,984,953 | 10/1976 | Kump | 52/143 |
| 4,480,415 | 11/1984 | Truss | 52/108 |
| 4,715,159 | 12/1987 | Hijazi | 52/646 |

FOREIGN PATENT DOCUMENTS

| | | | |
|---|---|---|---|
| 0288323 | 10/1988 | European Pat. Off. | 244/159 |
| 2075083 | 11/1981 | United Kingdom | 52/79.5 |

*Primary Examiner*—Charles T. Jordan
*Assistant Examiner*—Rochelle Lieberman
*Attorney, Agent, or Firm*—Alan B. Samlan

[57] ABSTRACT

A combination lunar and planetary transport having habitable quarters. The space vehicle has a substantially cylindrical body which is divisible into semi-cylindrical halves. There is a collapsible building construction system received within the cylindrical body which has a series of horizontally disposed collapsible floor slabs which stack one on top of the other in a collapsed storage position and assume a spaced parallel relationship when in an open position. Pivotal columns connect the floor slabs to provide for a scissors-like movement between the floor slabs and the pivotal columns. A flexible canopy structure is deployed from the space vehicle and encompasses the opened semi-cylindrical halves and fully erected floor slabs. The canopy is filled with ground regolith to create a radiation shield to protect the inhabitants.

27 Claims, 8 Drawing Sheets

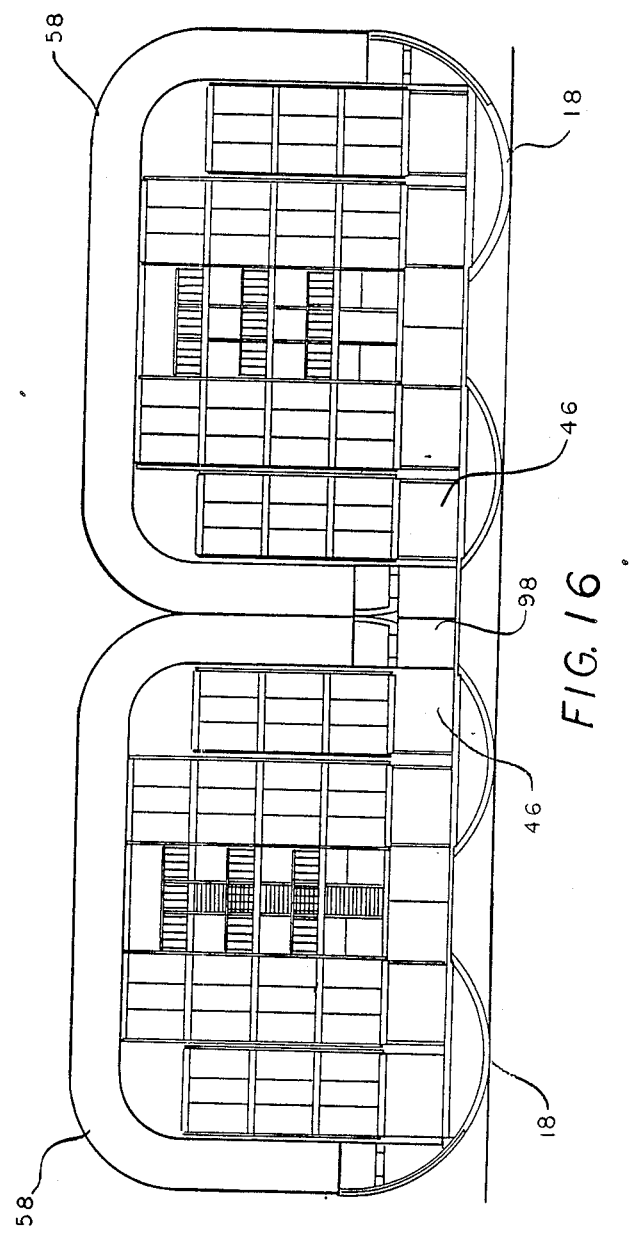

SPACE VEHICLE WITH COLLAPSIBLE LIVING QUARTERS

BACKGROUND AND SUMMARY OF THE INVENTION

This invention relates to a pre-fabricated, foldable, lunar base modular building system for use as habitats, offices and laboratories and which may be stored within a space vehicle for interplanetary transport and unfolded at the destination.

In spite of the advancements in building technology, the concepts for building systems which are adapted for ease and mobility are still limited to certain styles and applications. Only certain types of stationary and mobile structures have been pre-fabricated as complete units in a factory assembly line. The concept of a multi-story, pre-fabricated, foldable, modular, structural unit has paved the way for almost unlimited sizes of building complexes which can be pre-fabricated, pre-assembled, and shipped to a site for fast erection. Such structures are adaptable for use as residential apartments, offices, schools and hospital systems by modifying the unit to fit each particular purpose. On earth, these units can be transported by trucks, trailers, or even self-driven. Through special adaptation, these foldable units can be launched in special space vehicles which would open the door for a new era of human settlements on other planets. The units would be equipped and designed with adequate facilities for initial space colonization.

Prior to the establishment of permanent lunar settlements, such as paralleling those found on earth, an innovative architectural approach for a self-contained lunar base is needed. The object is to house preliminary facilities and personnel for the very initial stage where manual construction operations may be difficult, if not impossible, and to provide the essential protection from radiation.

The first habitat and work station on the lunar surface undoubtedly has to be pre-fabricated, self-erecting, and self-contained. To achieve this goal, the building structure must be folded and compacted to the minimum size and designed of minimum weight materials. They must also be designed to provide for maximum possible habitable and usable space on the moon. It is known that multi-story structures provide better space utilization than single story structures.

One example of a collapsible house is illustrated in U.S. Pat. No. 3,849,952. The design illustrated in this patent is not readily adaptable for placement in a space vehicle, nor is any such teaching suggested therein. Furthermore, the '952 patent does not provide means for giving adequate shielding from radiation, as the top of the structural unit itself would not provide adequate radiation shielding. Also, no self-leveling means or self-erection means are provided.

An example of a method used for constructing a building using inflated bags to form the roof and walls is illustrated in U.S. Pat. No. 4,304,084. However, there is an opening at the top of the unit which would be unacceptable for lunar settlements. Furthermore, if the radiation shielding is formed from ground regolith, as in applicant's invention, there are no means provided for a pumping or filling means internal to and carried by the basic building structure. Thus, an external concrete source must be available to provide the material to build the walls and roof of the building. There are also no provisions for storing such a structure in a lunar module which would be adaptable for space use.

Other examples of building systems which may be adaptable for providing the necessary radiation shielding are illustrated in U.S. Pat. Nos. 4,299,066 and 4,102,956. However, neither of these prior art devices are foldable or collapsible in such a manner as to be carried by a space vehicle. Also, neither of these vehicles suggest the use of lunar soil or regolith to provide the shielding.

The present invention comprises a cylinder adapted for launching and space travel which opens in two halves immediately after landing on the lunar surface. Contained within the cylinder are the foldable structural units which consist of one rigid and several collapsible floors. The collapsible floors stack one on top of the other when in their collapsed configuration and expand to provide the multi-level environment upon erection. The foldable units are self-erecting with lifting means being provided within the structure. Two ground regolith-filled pneumatic structures provide the radiation shielding. The regolith-filled pneumatic structures are supported by the erected internal skeletal structure. The pneumatic structures can be filled by pumping the lunar soil into the structure with a blower or pump system which is attached to or removable from the cylinder.

The collapsible structure design consists of several collapsible floor slabs, plus a base platform. The floor slabs are formed from two parallel, longitudinal beams connected together with secondary beams resulting in a substantially rectangular floor slab. Adjacent floor slabs are connected to each other with supportive columns connected to the longitudinal beams by pivotal hinged joints. The hinged connection allows for scissors-like rotations. Whenever the unit is folded for transport or storage, the slabs stack neatly above each other in their horizontal positions. In the unfolded position, a supportive column is connected to the floor slabs in the same manner to provide the scissors-like grid of vertical columns intersecting with horizontal floor slabs which allows for the rotation of the columns and maintains the horizontal stability of the floor slabs, thus achieving the system's foldable and collapsible nature.

A self-winching mechanism is attached to the top floor slabs of a pair of foldable units to provide a lifting mechanism. Single room enclosures are created through the use of wall panels that are stored in compartments in the floor slabs. Stairways are assembled between floors to provide for personnel movement.

OBJECTS AND ADVANTAGES

Accordingly, it is a primary object of this invention to provide a space vehicle having a lunar base module that provides a self-contained, collapsible building system. A related object is to provide a lunar base module that contains a foldable housing system that can be self-erected on the lunar surface without the need of heavy building construction mechanisms or apparatus which are separate and apart from the collapsible building structure.

A related object is to provide a habitable building structure that can easily and quickly be adapted for various usages such as living quarters, offices, laboratories, or medical facilities.

Yet another object is to provide the very initial or preliminary facilities at the initial stage of colonization of the lunar surface which can be easily erected with a minimum amount of manual construction operations.

Another object is to provide protection from radiation without the need for transporting radiation shields from earth. Related to this object is the object of using ground regolith to provide the necessary radiation shielding.

Still another object is to provide a lunar base module that has site self-adjustment means to adapt to the lunar surface and provide a structurally stable building.

Yet another object is to provide conventional habitable and usable architectural spaces suitable for the lunar gravity environment. Related to this object is the object of providing a modular, flexible and expandable interconnected network of modular structures for the future activities necessary at a lunar colony.

These and other objects and advantages are provided through a pre-fabricated, self-contained system which provides all necessary life support in the inventive foldable modular system described herein.

BRIEF DESCRIPTION OF THE DRAWINGS

FIG. 16 is an end view of two cylindrical capsules fully opened with their modular building system fully erected and placed adjacent each other with an interconnecting walkway.

DESCRIPTION OF THE PREFERRED EMBODIMENT

Figures 1, 2, 3:
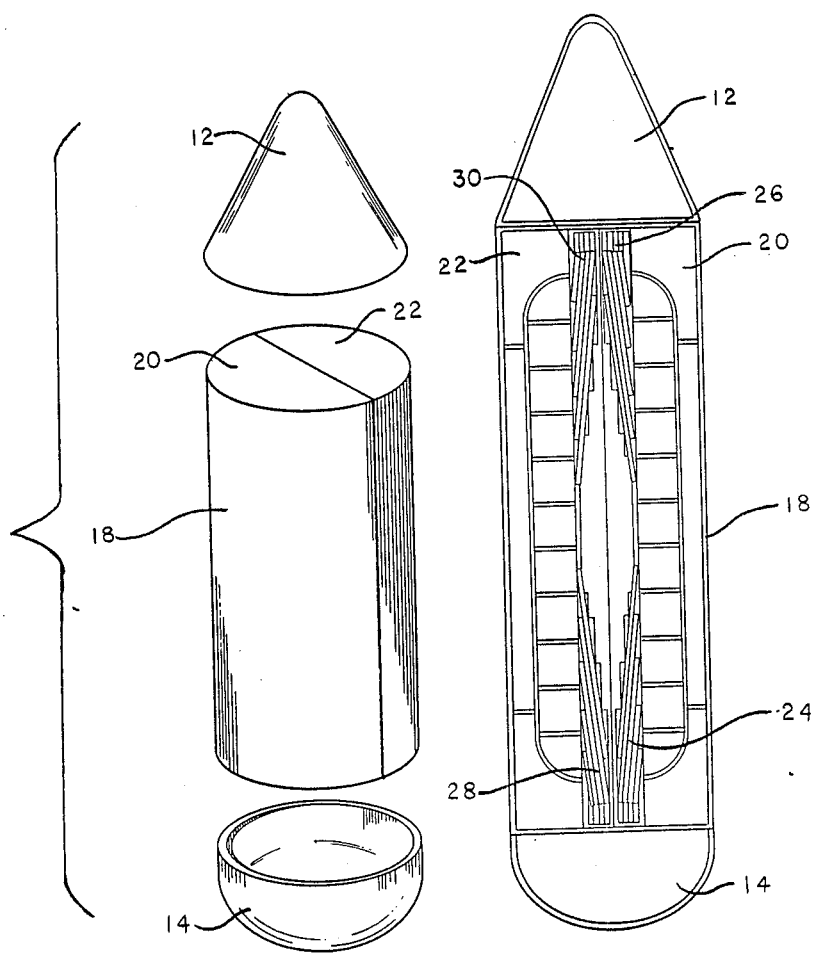
FIG. 1 is a side-elevation view of a space vehicle with booster rockets attached to its sides with the collapsible living quarters.
FIG. 2 is a cross-sectional view of the space vehicle with the booster rockets removed.
FIG. 3 is an exploded view of the space vehicle with the nose and tail portions separated from the cylindrical body portion.

Turning first to FIG. 1, there is illustrated a space vehicle 10 having a removable nose cone 12, a tail cone 14, booster rockets 16 and a cylindrical body 18. As seen in FIGS. 2 and 3, the cylindrical body 18 is comprised of two cylindrical halves 20 and 22. Cylindrical half 20 has a pair of foldable structures 24 and 26, and cylindrical half 22 has a pair of foldable structures 28 and 30.

Figure 4:
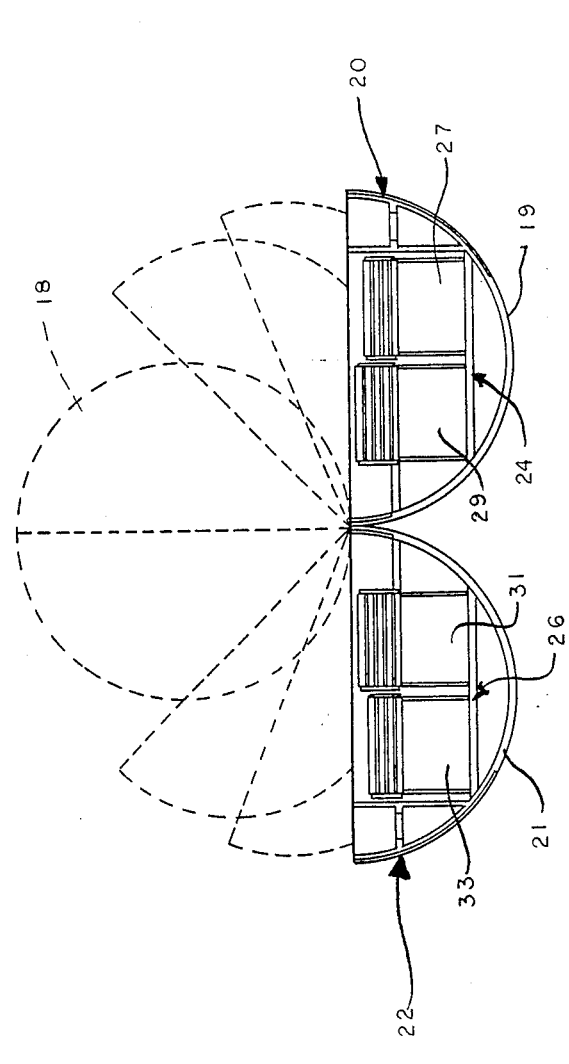
FIG. 4 is an end view of the cylindrical body portion illustrating in phantom the opening of the cylindrical body into two semi-cylindrical halves.
Figure 5:
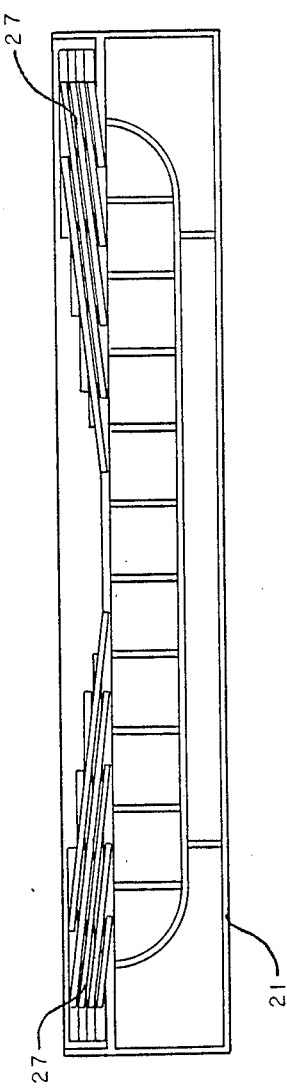
FIG. 5 is a side elevation view of one of the cylindrical bodies illustrating the collapsible building system in its fully collapsed position.

Turning to FIG. 4, there is illustrated a cylindrical body 18 progressing through its various opening stages (illustrated in phantom) from its initially closed position to its fully opened position. Outer shells 19 and 21 of the two halves 20 and 22 have their bottommost portions resting on the lunar surface. The foldable structures 24 and 26 are seen to comprise separate structures 27, 29, 31 and 33 with structures 29 and 31 being the same height, and structures 27 and 33 being a slightly lower height when erected. Gravity is the main force that is used to allow the two cylindrical halves 20 and 22 to drop down in a book-like manner towards the lunar surface. Separate means such as a hoist chain or winch could connect the outer shells 19 and 21 together and when a sufficient force is applied would pull the two cylindrical halves 20 and 22 towards each other such that the top surface of the open cylindrical halves would be substantially parallel to the lunar surface and form a continuous plain such as shown in FIG. 4. Alternatively, or in combination therewith, jacks (not illustrated) may be placed between the outer shells 19 and the lunar surface to level the halves.

Figure 6:
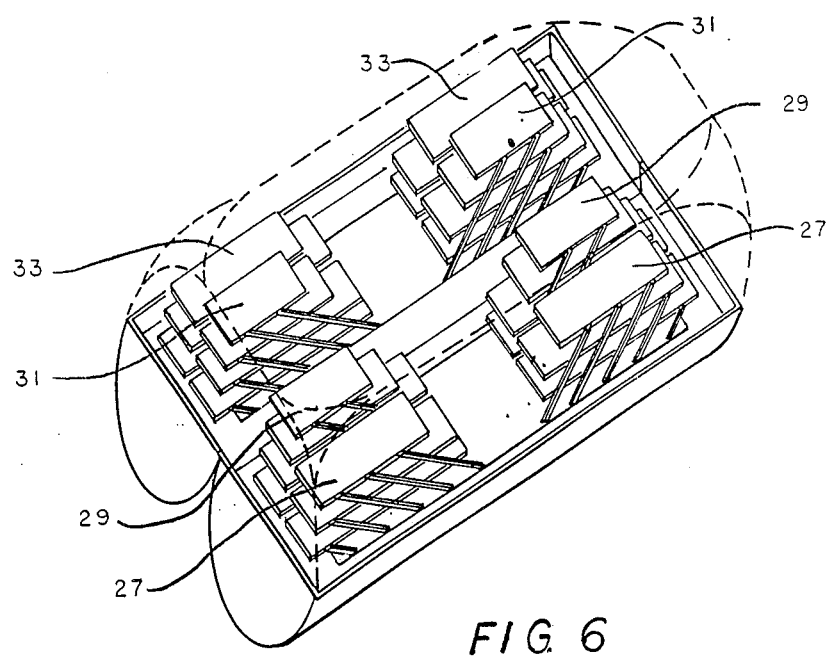
FIG. 6 is a perspective view of the cylindrical body portion in its open position with several pairs of collapsible structures in their partially raised positions.

In FIG. 6, one can see the overall view of the foldable structures 27, 29, 31 and 33 in a partially erected position. The structures 27, 29, 31 and 33 are actually formed in pairs with two mating structures in each pair joined together at one end of their respective ends. It can also be seen that the structures 29 and 31 are slightly taller than the structures 27 and 33, as will be more fully explained later.

Figure 7:
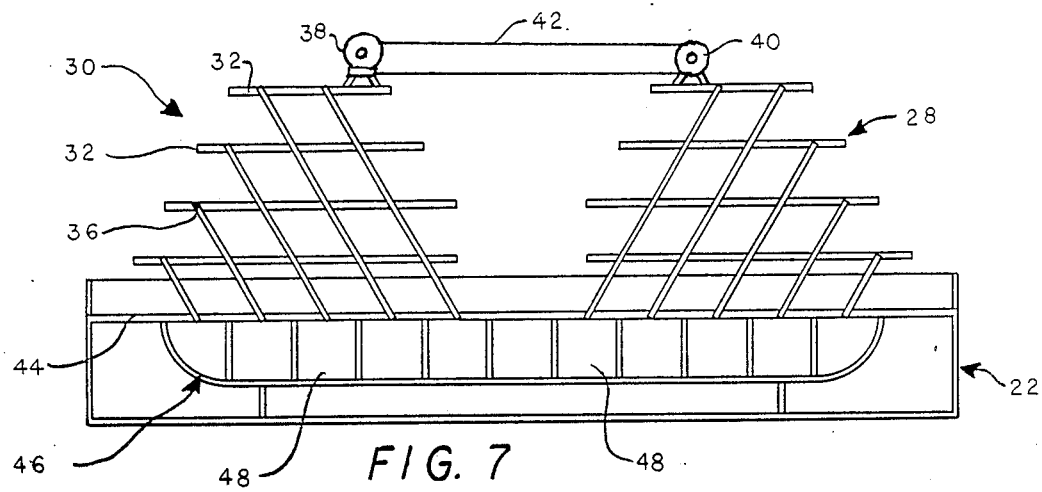
FIG. 7 is a side view of the cylindrical body portion with the collapsible building structure raised approximately half way from its collapsed position to its fully constructed position.

As seen in FIG. 7, the foldable structures 28 and 30 have a series of collapsible floor slabs 32 supported by support columns 34. The collapsible floor slabs 32 serve a dual function of being a floor for one level and a ceiling for the level below. The floor slabs 32 are formed by floor beams (not illustrated) running along the edges of the floor slabs 32. The floor beams are connected by additional horizontal beams which maintain the floor beams in a space-parallel relationship. Metal decking or other suitable flooring material such as fiberglass may be used to finish the floor slab and provide the walking and ceiling surfaces.

The support columns 34 are connected to the floor slabs 32 at pivotal hinge joints 36 with the use of pivot pins (not illustrated) which occur at each intersection of a support column 34 and a horizontal collapsible floor slab 32. The pivotal hinge joints 36 provide for a scissors-like movement between the floor slabs 32 and the support columns 34 when the foldable structure 28 or 30 is moved from its folded position to its fully erected position. The support columns 34 also maintain the floor slabs 32 in a fixed parallel relationship with respect to each other when the structure is in the erected position.

There is also illustrated in FIG. 7 a self-erecting system. This is illustrated with the winch 38 being mounted to the top floor slab 32. A pulley 40 is connected by a cable 42 to the winch 38. When the foldable structures 28 and 30 are in the collapsed folded position, the winch is energized which pulls the cable 42 taut. As the winch 38 continues to pull the cable 42, the foldable structures 28 and 30 are drawn towards each other which causes the structures to be self-erecting. Other types of self-erecting systems would be available to those skilled in the art. For example, by extending the bottom portion of one of the support columns 34 in each of the foldable structures 27, 29, 31 and 33, and providing the appropriately directed force, the foldable structures are caused to pivot around the bottom pivotal hinge joint 36 of each of the support columns 34 causing the foldable structures to be raised.

Figure 8:
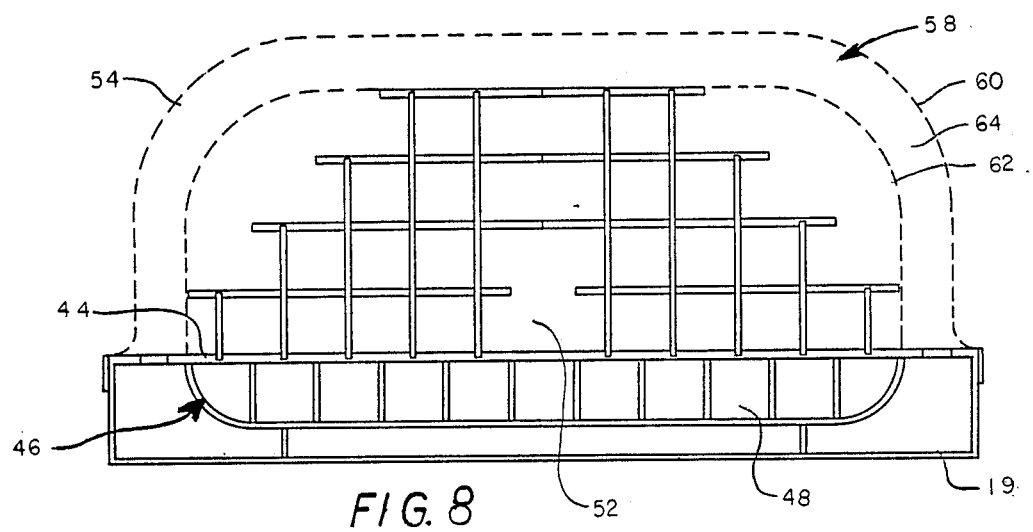
FIG. 8 is a side elevational view of the cylindrical body portion with the collapsible building construction system in its fully constructed position with the pneumatic flexible bag structure illustrated in phantom.
Figure 9:
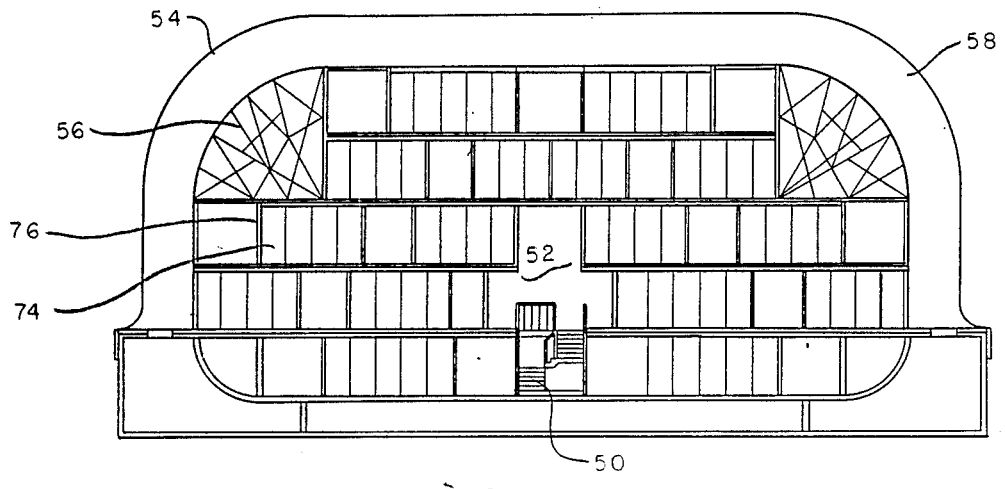
FIG. 9 is a side elevational view similar to FIG. 8 with the collapsible building construction system divided into individual rooms and further illustrating a portion of the supporting lattice.

The support columns 34 have their bottommost pivotal hinge joints 36 connected to a rigid floor 44. The rigid floor 44 forms the top of a fixed base platform 46 as can be seen in FIGS. 7-9. The fixed base platform forms the base structure on which the collapsible structures are mounted. There is one fixed base platform in each of the cylindrical halves 20, 22. The fixed base platform 46 is divided into a series of permanent rooms 48 which will permanently accommodate laboratories, work stations, fixed utility machinery and infra structures. These rooms can also be used for seating astronauts and crew members of a space mission during the trip. Other of these rooms 48 will be used as storage areas for the furniture and equipment of the upper collapsible floors. The fixed base platform is reached through a permanent staircase 50 (FIG. 9) leading up to the central main space of the lunar base.

FIG. 8 shows the foldable structures 28 and 30 in their fully erected position. As can be seen in this Figure, the two foldable structures have the edges of collapsible floor slabs 32 meeting each other to provide a continuous floor or ceiling surface. Suitable mating and locking devices are used to provide a safe, secure and smooth connection. However, the floor slabs can be designed with portions removed to provide a higher, double-story ceiling to form larger areas such as a main corridor 52.

As seen in FIG. 9, a pneumatic structure 54 is deployed and inflated around the foldable structures 28 and 30 after they are fully erected. The pneumatic structure 54 is supported by the top collapsible floor slabs 32 of the foldable structures 28 and 30. Additionally, a support lattice 56 made of lightweight tubular members is erected to give additional support. The support lattice is connected to floor slabs 32 and support columns 34 to transfer the weight of the pneumatic structure down through the fixed base platform 46 to the lunar surface. The pneumatic structure 54 forms a canopy 58 having an outer layer 60 and inner layer 62 which define a cavity 64 between them which is inflated after the foldable structures 28 and 30 and the support lattice 56 are in place.

Figure 10:
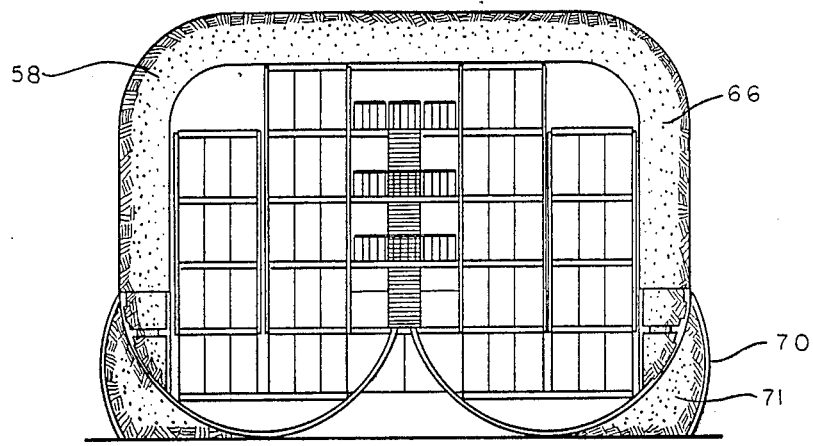
FIG. 10 is an end view of the cylindrical body with the ground regolith in place around the perimeter.

Ground regolith 66 is then pumped into the cavity 64 until the cavity is completely filled (see FIG. 10). The ground regolith can be introduced into the cavity 64 through an opening in the outer shell 19 of the cylinder. Suitable pumping means such as a sand pump or blower system can be used to fill the cavity 64.

The thickness of the cavities can be adjusted as canopy 58 is preferably manufactured from a flexible material. Thus, the thickness of the shielding will be adjusted depending upon the amount of radiation shielding required. An additional pneumatic or solid structure 70 can also be used to surround the cylindrical half 22 as seen in FIG. 10. This structure 70 will provide a second cavity 71 between the base of the cylindrical half 22 and the lunar surface. The second cavity 71 is filled with ground regolith 66 just like the cavity 64 to provide a radiation shield.

Figure 11:
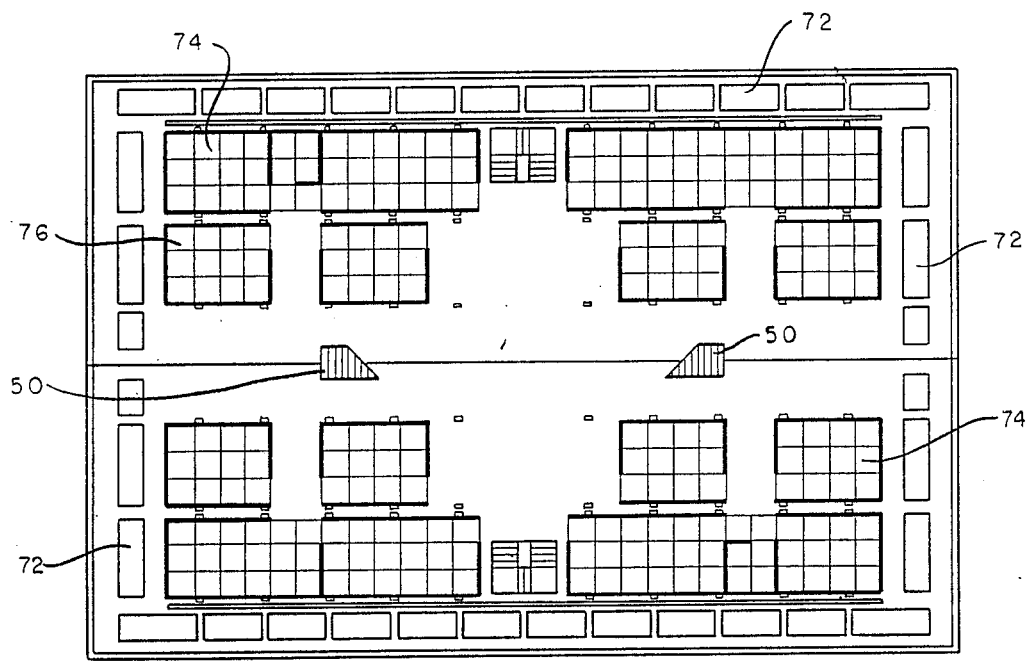
FIG. 11 is a top plan view of the rigid fixed floor.

FIG. 11 shows a floor plan of the fixed base platform. Surrounding the perimeter of the cylindrical halves 20 and 22 are a plurality of regolith openings 72. These are designed to permit the regolith to flow up into the canopy 58 or down into the second cavity 71. Individual rooms 74 can be designed of any particular given size. By the addition or movement of wall panels 76, rooms can easily be enlarged or made smaller. Preferably the wall panels 76 are stored in compartments in the floor slabs 32 and can be dropped down and locked into place where required. They may be conveniently hinged along one edge to make their installation simple and convenient.

Figure 12:
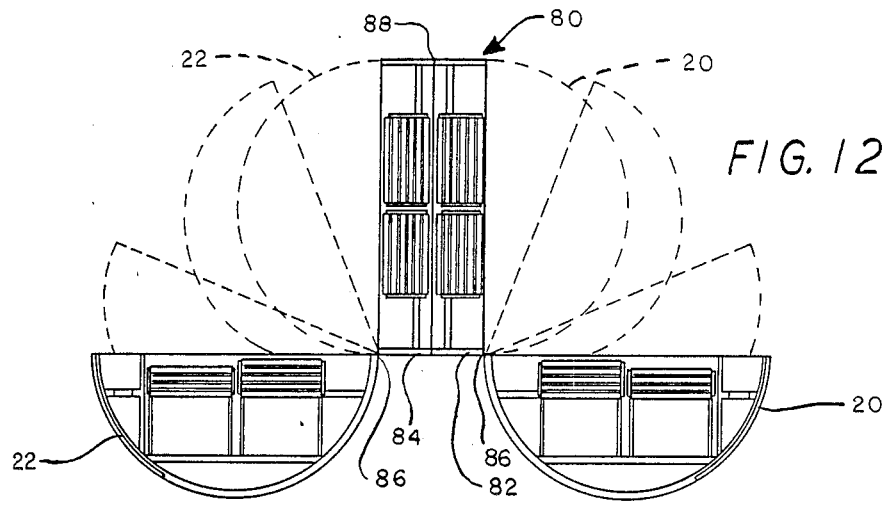
FIG. 12 is an end view of an alternate embodiment of the cylindrical body.

In FIG. 12 there is illustrated an alternate embodiment of the inventive space vehicle. The cylindrical halves 20 and 22 have an additional intermediary section 80 placed between the two halves. The intermediary section 80 is seen to be comprised of two folding sections 82 and 84 which are connected by hinge pivots 86 to their respective cylindrical halves 20 and 22. The folding sections 82 and 84 are also pivotally connected at a top hinge pivot 88.

Figure 13A:
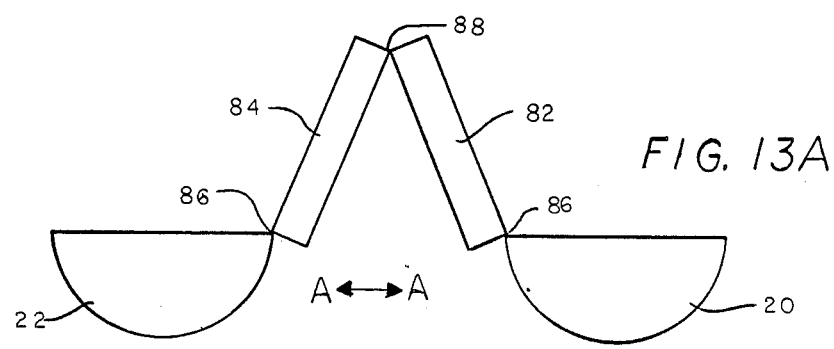
FIGS. 13a-13c is a schematic diagram showing three stages in the opening of the cylindrical body illustrated in FIG. 12.
Figure 13B:
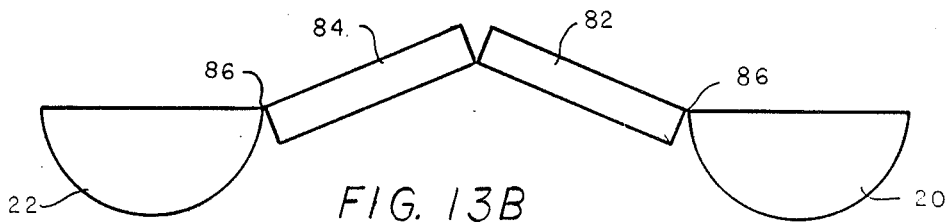
Figure 13C:
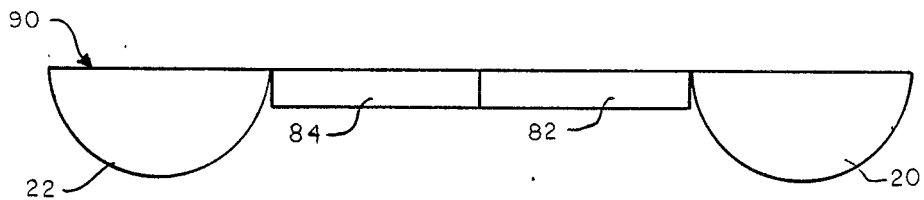

The alternate embodiment opens by having the two cylindrical halves 20 and 22 drop down in book-like fashion as shown in phantom in FIG. 12. In order to have the structure fully opened, the two cylindrical halves 20 and 22 must be moved away from each other in the direction indicated by arrow A—A to permit the folding sections 82 and 84 to drop down and assume their horizontal position. The opening of the structure is shown in FIGS. 13A through 13C. It may be necessary to provide a jack, hydraulic cylinders or other suitable force exerting means between the cylindrical halves 20 and 22 to provide the forces necessary to separate the two halves permitting the folding sections 82 and 84 to drop down into the opened position. As seen in FIG. 13C, the fully opened position provides a substantially flat horizontal surface 90 across the cylindrical halves 20 and 22 and the folding sections 82 and 84.

Figure 14:
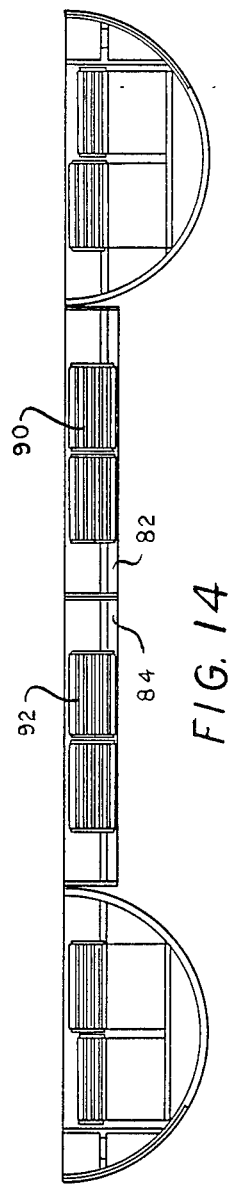
FIG. 14 is a cross-sectional end view of the alternate embodiment illustrated in FIG. 12 showing the collapsible building system in its collapsed condition.
Figure 15:
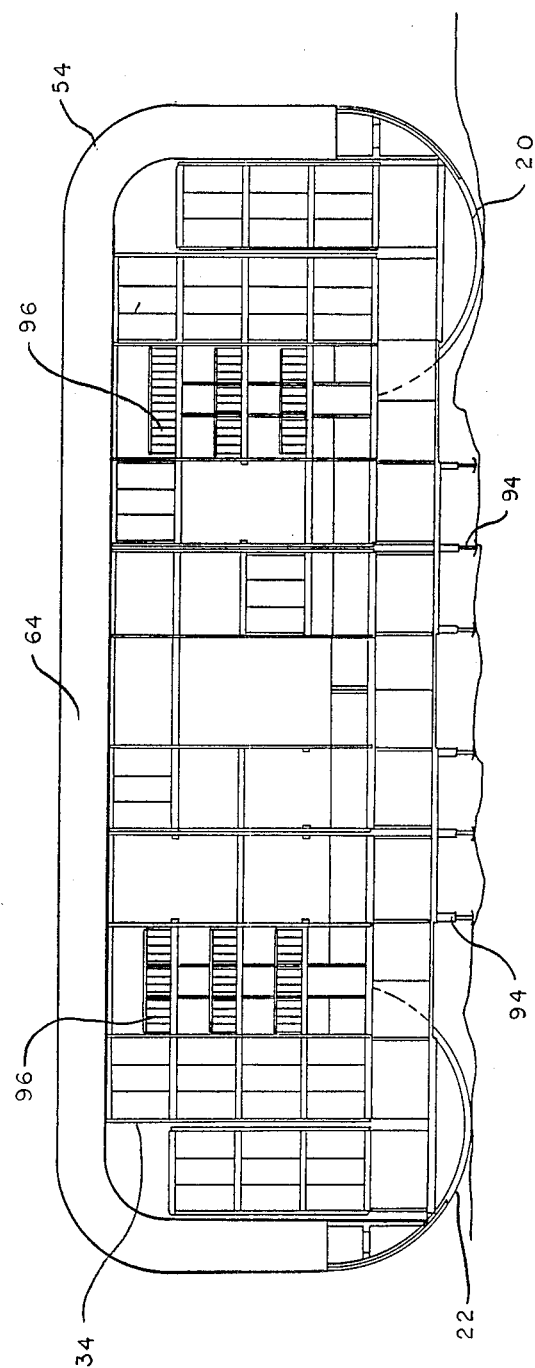
FIG. 15 is an end view of the embodiment illustrated in FIG. 12 with the collapsible building system in its fully erected position and the pneumatic bag encompassing the outside perimeter.

As seen in FIG. 14 the folding sections 82 and 84 have additional foldable structures 90 and 92 stored within them. During erection, the pneumatic structure 54 is deployed and forms a canopy 58 as seen in FIG. 15. The canopy 58 is substantially identical to the canopy as illustrated in FIG. 8 and partially encompasses the several foldable structures after they are fully erected. As seen in FIG. 15, a series of leveling jacks 94 are used to support the folding sections 82 and 84 and to properly level them. The pneumatic structure has the cavity 64 filled with ground regolith in one of the manners as previously described. The weight from the ground regolith is transferred through the support columns 34 down to the leveling jacks 94. Stairways 96 are erected after the foldable structures are fully erected to provide access to the various levels.

FIG. 16 shows how two of the cylindrical bodies 18 can be positioned adjacent each other in a lengthwise orientation to provide for increased living spaced and the eventual construction of a colony. The sides of the cylindrical bodies are provided with panels that can be removed to form corridors 98. Through the use of the corridors 98 leading between the fixed base platforms 46, the structures can be interconnected. The corridors 98 can be of a telescopic design with appropriate sealing means to make the interconnection air-tight. In this manner, multiple cylinders of varying special uses can be interconnected to form a colony.

Thus, it is apparent that there has been provided, in accordance with the invention, a space vehicle having collapsible living quarters suitable for use as laboratories, medical facilities, living quarters, or offices, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A combination lunar and planetary transport having habitable quarters comprising:
   a space vehicle having a substantially cylindrical body portion, the body portion divisible along its long axis for opening into two semi-cylindrical halves;
   a collapsible building construction system received within the substantially cylindrical body comprising:
   a plurality of horizontally disposed collapsible floor slabs which are adapted for stacking one on top of the other in a collapsed storage position and which are adapted to assume a spaced parallel relationship when in an opened position,
   pivotal columns for connecting the horizontally disposed collapsible floor slabs to the above or below adjacent floor slabs, the pivotal columns connected to the floor slabs at pivot points to provide for a scissors-like movement between the floor slabs and the pivotal columns,
   a flexible canopy structure deployable from the space vehicle, the canopy at least partially encompassing the opened semi-cylindrical halves and the collapsible floor slabs when in an opened position, the canopy having inside and outside walls defining a cavity between them, and
   means for filling the cavity with ground regolith to create a radiation shield to protect inhabitants occupying the quarters.

2. The combination as defined in claim 1 and further comprising means for bracing the floor slabs and pivotal columns in the opened position.

3. The combination as defined in claim 1 and further comprising means for supporting the flexible canopy structure.

4. The combination of claim 3 wherein the means for supporting the canopy structure comprises a skeletal network of supporting beams which transfers the weight of the canopy to the pivotal columns which in turn transfer the weight to the semicylindrical halves.

5. The combination as defined in claim 1 and further comprising hinge means for securing the two semi-cylindrical halves to each other along one of the long edges of each of the cylindrical halves when the cylindrical body is opened.

6. The combination as defined in claim 1 wherein the canopy structure is a pneumatic bag, and further comprising means for inflating the pneumatic bag before the ground regolith fills the cavity.

7. The combination as defined in claim 6 wherein the pneumatic bag is of flexible material which provides for adjustments in the thickness of the cavity and ground regolith fill depending upon the degree of radiation shielding required.

8. The combination as defined in claim 1 and further comprising a second flexible canopy, the second canopy encircling a base portion of the semi-cylindrical halves and having an exterior wall defining a second cavity between the exterior wall and the opened cylindrical half, and means for filling the second cavity with ground regolith.

9. The combination as defined in claim 1 wherein the plurality of horizontally disposed collapsible floors are assembled in modular units with two units forming a pair, an edge of the collapsible floor of one unit interfacing with an edge of the collapsible floor of its pairing unit when both units are opened.

10. The combination as defined in claim 9 and further comprising self-erecting means for raising the horizontally disposed collapsible floor slabs after the cylindrical body has been opened.

11. The combination as defined in claim 10 wherein the self-erecting means comprises a winch mounted on the collapsible floor of one of the units and a cable connected to the collapsible floor of its pairing unit.

12. The combination as defined in claim 1 and further comprising leveling means on the cylinder halves to level the cylinder halves with respect to the ground.

13. The combination as defined in claim 1 and further comprising a blower assembly to blow ground regolith into the cavity.

14. The combination as defined in claim 1 and further comprising wall partitions that divide the space between floor slabs into rooms.

15. The combination as defined in claim 1 and further comprising a fixed base structure mounted in each of the semicylindrical halves forming a base upon which are mounted the horizontally disposed collapsible floor slabs, and the fixed base structure divisible into individual rooms.

16. A collapsible building construction system for lunar or planetary surface applications comprising:
   a space vehicle having a substantially cylindrical body portion, a curved cylindrical wall defining the exterior of the cylindrical body portion, the cylindrical body portion divisible along its long axis for opening into two semicylindrical halves which are joined to each other, each semicylindrical half adapted for resting on the planetary surface with the cylindrical wall of the semi-cylindrical half contacting the lunar surface and the flat planar portion of the semi-cylindrical half spaced apart from and in a plane parallel to the lunar surface,
   a collapsible frame structure having horizontal floor slabs and pivotal columns connecting the horizontal floor slabs, the collapsible frame structure stored in the semi-cylindrical half,
   pivot joints connecting the horizontal floor slabs to the pivotal columns to provide a scissors-like movement between the floor slabs and the pivotal columns,
   a base platform firmly affixed in the semicylindrical half, the base platform providing a structural support for the collapsible frame structure, a flexible canopy structure stored in the semicylindrical half, the canopy covering the collapsible frame structure above the lunar surface when it is erected to an upright position, the canopy having inside and outside walls defining a cavity between them, and means for filling the cavity with ground regolith to create a radiation shield to protect inhabitants occupying the collapsible frame structure.

17. The collapsible building of claim 16 and further comprising a skeletal network of supporting beams for supporting the flexible canopy.

18. The collapsible building of claim 16 wherein the canopy structure is a pneumatic bag, and further comprising means for inflating the pneumatic bag before the ground regolith fills the cavity.

19. The collapsible building of claim 16 and further comprising a second flexible canopy, the second canopy encircling a base portion of the semi-cylindrical halves and having an exterior wall defining a second cavity between the exterior wall and the opened cylindrical half, and means for filling the second cavity with ground regolith.

20. The collapsible building of claim 16 wherein the pneumatic bag is of flexible material which provides for adjustments in the thickness of the cavity and ground regolith fill depending upon the degree of radiation shielding required.

21. A combination lunar and planetary transport having habitable quarters comprising:

a space vehicle having a body portion formed from two semi-cylindrical halves separated along their lengths by a substantially rectangular box intermediary section, the semicylindrical halves and rectangular box section adapted for opening on a planetary surface, the rectangular box section forming a bridge between the two semi-cylindrical halves when the semi-cylindrical halves are opened and separated;

a collapsible building construction system received within the body portion comprising:

a plurality of horizontally disposed collapsible floor slabs which are adapted for stacking one on top of the other in a collapsed storage position and which are adapted to assume a space parallel relationship when in an opened position;

pivotal columns for connecting the horizontally disposed collapsible floor slabs to the above or below adjacent floor slabs, the pivotal columns connected to the floor slabs at pivot points to provide for a scissors-like movement between the floor slabs and the pivotal columns;

a flexible canopy structure deployable from the space vehicle, the canopy at least partially encompassing the opened and separated semi-cylindrical halves and the rectangular box and the collapsible floor slabs when in an opened position, the canopy having inside and outside walls defining a cavity between them; and means for filling the cavity with ground regolith to create a radiation shield to protect inhabitants occupying the quarters.

22. The combination as defined in claim 21 and further comprising a second rectangular box intermediary section mounted adjacent the rectangular box intermediary section and separating the two semi-cylindrical halves.

23. The combination as defined in claim 21 and further comprising means for supporting the flexible canopy structure comprising a skeletal network of supporting beams which transfers the weight of the canopy to the pivotal columns which in turn transfers the weight to the semi-cylindrical halves.

24. The combination as defined in claim 21 and further comprising hinge means for securing the two semi-cylindrical halves to the rectangular box intermediary section along one of the long edges of each of the cylindrical halves and one of the long edges of the rectangular box intermediary section when the cylindrical body is opened.

25. A method for building lunar housing structures on a lunar surface comprising:

folding a prefabricated housing skeletal frame into two mating semi-cylindrical containers;

closing the semi-cylindrical containers to form one cylindrical body;

joining the cylindrical body to space control and propulsion means for space travel;

opening the cylindrical body to re-form the two mating semi-cylindrical halves after landing on the lunar surface;

unfolding the prefabricated housing skeletal frames;

deploying a bag-like canopy around the skeletal frames; and filling the bag-like canopy with ground regolith for providing a radiation shield.

26. The method of claim 25 and further comprising the step of adding dividing walls to the skeletal frame to form individual rooms.

27. The method of claim 25 further comprising the step of leveling the cylindrical body before unfolding the skeletal frames.

* * * * *